United States Patent [19]

Ruka et al.

[11] Patent Number: 5,916,700
[45] Date of Patent: Jun. 29, 1999

[54] LANTHANUM MANGANITE-BASED AIR ELECTRODE FOR SOLID OXIDE FUEL CELLS

[75] Inventors: Roswell J. Ruka, Pittsburgh; Lewis Kuo, Monroeville, both of Pa.; Baozhen Li, Essex Junction, Vt.

[73] Assignee: Siemens Westinghouse Power Corporation, Orlando, Fla.

[21] Appl. No.: 09/012,778

[22] Filed: Jan. 23, 1998

[51] Int. Cl.$^6$ ...................................................... H01M 8/10
[52] U.S. Cl. ................................ 429/30; 429/31; 429/40; 252/521.1; 501/152
[58] Field of Search .................................. 429/30, 31, 33, 429/40, 42, 44; 252/521.1; 501/152

[56] References Cited

U.S. PATENT DOCUMENTS

| | | | |
|---|---|---|---|
| 4,395,468 | 7/1983 | Isenberg | 429/31 |
| 4,476,196 | 10/1984 | Poeppel et al. | 429/32 |
| 4,476,198 | 10/1984 | Ackerman et al. | 429/32 |
| 4,490,444 | 12/1984 | Isenberg | 429/31 |
| 4,562,124 | 12/1985 | Ruka | 429/30 |
| 4,645,622 | 2/1987 | Kock | 252/521 |
| 4,751,152 | 6/1988 | Zymboly | 429/31 |
| 4,767,518 | 8/1988 | Maskalick | 204/242 |
| 4,874,678 | 10/1989 | Reichner | 429/30 |
| 4,888,254 | 12/1989 | Reichner | 429/31 |
| 5,106,706 | 4/1992 | Singh et al. | 429/31 |
| 5,108,850 | 4/1992 | Carlson et al. | 429/31 |
| 5,277,995 | 1/1994 | Ruka et al. | 429/31 |
| 5,342,704 | 8/1994 | Vasilow et al. | 429/31 |
| 5,604,048 | 2/1997 | Nishihara et al. | 429/30 |
| 5,686,198 | 11/1997 | Kuo et al. | 429/30 |
| 5,759,936 | 6/1998 | Christiansen et al. | 429/30 |

FOREIGN PATENT DOCUMENTS

593281A2  4/1994  European Pat. Off. .

*Primary Examiner*—Bruce F. Bell

[57] ABSTRACT

An air electrode material for a solid oxide fuel cell is disclosed. The electrode material is based on lanthanum manganite having a perovskite-like crystal structure $ABO_3$. The A-site of the air electrode material preferably comprises La, Ca, Ce and at least one lanthanide selected from Sm, Gd, Dy, Er, Y and Nd. The B-site of the electrode material comprises Mn with substantially no dopants. The ratio of A:B is preferably slightly above 1. A preferred air electrode composition is of the formula $La_wCa_xLn_yCe_zMnO_3$, wherein Ln comprises at least one lanthanide selected from Sm, Gd, Dy, Er, Y and Nd, w is from about 0.55 to about 0.56, x is from about 0.255 to about 0.265, y is from about 0.175 to about 0.185, and z is from about 0.005 to about 0.02. The air electrode material possesses advantageous chemical and electrical properties as well as favorable thermal expansion and thermal cycle shrinkage characteristics.

19 Claims, 7 Drawing Sheets

LANTHANUM MANGANITE-BASED AIR ELECTRODE FOR SOLID OXIDE FUEL CELLS

STATEMENT OF GOVERNMENT INTEREST

The Government of the United States of America has certain rights in this invention pursuant to Contract No. DE-FC21-91MC28055 awarded by the U.S. Department of Energy.

FIELD OF THE INVENTION

The present invention relates to solid oxide fuel cells, and more particularly relates to an electrode material for use in such fuel cells comprising lanthanum manganite with substantially no doping of the manganese site.

BACKGROUND INFORMATION

Solid oxide fuel cells (SOFCs) are used to generate electrical energy through electrochemical reactions between air and hydrocarbon fuel gas to produce a flow of electrons in an external circuit. Generators based on SOFCs offer a clean and highly efficient approach for electrochemical generation of electricity. Conventional solid oxide fuel cells are disclosed in U.S. Pat. Nos. 4,395,469 to Isenberg, 4,476,196 to Poppel et al., 4,476,198 to Ackerman, et al., 4,490,444 to Isenberg, 4,562,124 to Ruka, 4,751,152 to Zymboly, 4,767,518 to Maskalick, 4,888,254 to Reichner, 5,106,706 to Singh, et al., 5,108,850 to Carlson, et al., 5,277,995 to Ruka, et al. and 5,342,704 to Vasilow, et al. Each of these patents is incorporated herein by reference.

The air electrodes or cathodes of conventional solid oxide fuel cells typically have porosities of from about 20 to 40 percent, and also have good electrical conductivities. The air electrodes are usually comprised of oxides having a perovskite-like crystal structure ($ABO_3$), such as $LaMnO_3$ wherein the La occupies the A-site and the Mn occupies the B-site. In addition to doped $LaMnO_3$ air electrodes, SOFCs typically consist of a yttria stabilized $ZrO_2$ electrolyte, a doped $LaCrO_3$ interconnection, and a Ni—$ZrO_2$ cermet fuel electrode or anode.

Important properties for the components of SOFCs between room temperature and 1,000° C. include chemical compatibility between each of the components, chemical stability of the air electrode in air, chemical stability of the fuel electrode in a reducing fuel atmosphere, and chemical stability of the interconnection in both oxidizing and reducing atmospheres, as well as a number of physical properties described below.

One air electrode material currently in use has a nominal composition $La_{0.7}Ca_{0.2}Ce_{0.105}Mn_{0.94}Cr_{0.04}Ni_{0.02}O_3$. This material is an improvement over previously used material of the formula $La_{0.8}Ca_{0.2}MnO_3$, in that it shows much less shrinkage when thermal cycled between 25 and 1,000° C. However, it would be desirable to have a composition with a closer match of thermal expansion to the zirconia electrolyte, an even lower thermal cycle shrinkage, a thermal expansion which shows little or no change with time, and no perceptible phase change in the fabrication and operational temperature ranges of the SOFC.

SUMMARY OF THE INVENTION

The present invention provides an improved SOFC air electrode material having substantially no Mn-site doping which satisfies the above-noted chemical requirements. In addition to highly advantageous chemical properties, the electrode material of the present invention preferably possesses a thermal expansion coefficient in the temperature range of 25 to 1,000° C. within 1 percent of the value for the SOFC electrolyte, e.g., approximately $10.5 \times 10^{-6}$/° C. for a yttria stabilized zirconia electrolyte. The present electrode material also exhibits very low thermal cycle shrinkage for repeated cycling in the temperature range of 600 to 1,000° C., preferably amounting to about 0.001 percent per cycle or less. The material further possesses a resistivity similar to or lower than conventional materials.

An object of the present invention is to provide a solid oxide fuel cell air electrode composition comprising a perovskite-like crystal structure of the formula $ABO_3$, wherein the A-site comprises La, Ca, Ce and at least one lanthanide selected from Sm, Gd, Dy, Er, Y and Nd, and the B-site comprises Mn with substantially no dopants. The ratio of A:B is preferably from about 1:1 to about 1.02:1.

Another object of the present invention is to provide a solid oxide fuel cell air electrode composition of the formula $La_wCa_xLn_yCe_zMnO_3$, wherein Ln comprises at least one lanthanide selected from Sm, Gd, Dy, Er, Y and Nd, w is from about 0.55 to about 0.56, x is from about 0.255 to about 0.265, y is from about 0.175 to about 0.185, and z is from about 0.005 to about 0.02.

These and other objects of the present invention will be more readily understood from the following description.

DETAILED DESCRIPTION OF THE PREFERRED EMBODIMENTS

Solid oxide fuel cell generators include a gas-tight, thermally insulated housing which houses individual chambers including a generator chamber and a combustion chamber. The generator chamber, in which power generation occurs, contains a solid oxide fuel cell stack which is made up of an array of axially elongated, tubular, series-parallel connected solid oxide fuel cells, and associated fuel and air distributing equipment. The solid oxide fuel cells contained in the generator chamber can take on a variety of well known configurations, including tubular, flat plate, and corrugated designs, which are taught in U.S. Pat. Nos. 4,395,468 to Isenberg and 4,490,444 to Isenberg for tubular SOFCs, U.S. Pat. No. 4,476,196 to Poppel et al. for flat plate SOFCs, and U.S. Pat. No. 4,476,198 to Ackerman et al. for corrugated SOFCs. While tubular solid oxide fuel cells are discussed primarily herein, it is to be understood that air electrodes for use in other SOFC configurations are within the scope of the invention.

Figure 1:
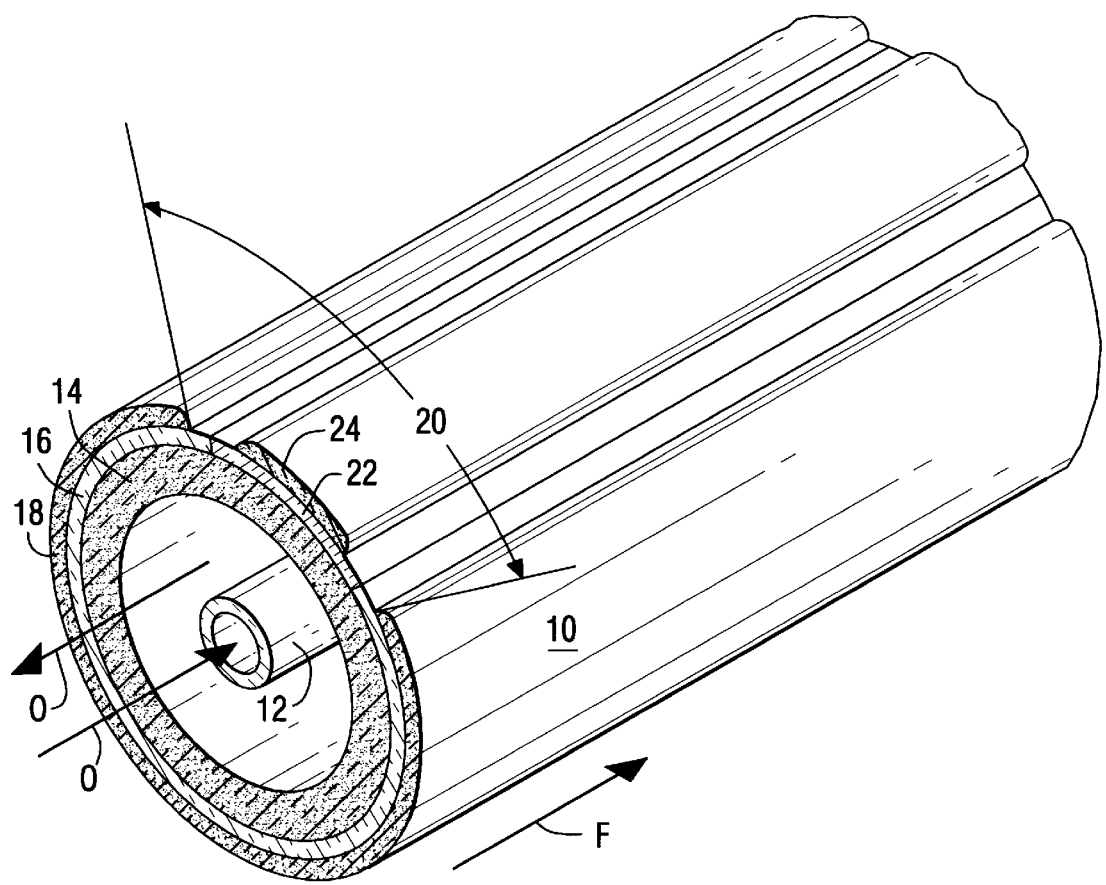
FIG. 1 is a sectional perspective view of a solid oxide fuel cell including an air electrode having a composition in accordance with the present invention.

FIG. 1 shows a preferred tubular solid oxide fuel cell 10. The preferred configuration is based upon a fuel cell system in which a flowing gaseous fuel, such as natural gas, hydrogen or carbon monoxide, is directed axially over the outside of the fuel cell, as indicated by the arrow F. A flowing oxidant, such as air or oxygen, is fed through an optional riser tube 12, positioned within the annulus of the fuel cell and extending near the closed end of the fuel cell, and then out of the riser tube back down the fuel cell axially over the inside wall of the fuel cell, as indicated by the arrow O.

The solid oxide fuel cell comprises a tubular air electrode 14 (or cathode). The air electrode 14 may have a typical length of about 50 to 250 cm and a typical thickness of about 1 to 3 mm. In accordance with the present invention, the air electrode 14 comprises doped lanthanum manganite having an $ABO_3$ perovskite-like crystal structure, which is extruded or isostatically pressed into tubular shape and then sintered. A process of making air electrodes is disclosed in detail in U.S. patent application Ser. No. 08/608,889, which is incorporated herein by reference.

Surrounding most of the outer periphery of the air electrode 14 is a layer of a dense, gas-tight, oxygen ion permeable, solid electrolyte 16, typically made of calcia- or yttria-stabilized zirconia. A preferred solid electrolyte composition is $(Y_2O_3)_{0.1}(ZrO_2)_{0.9}$, which has a coefficient of thermal expansion of about $10.5 \times 10^{-6}/°$ C. The solid electrolyte 16 is typically about 0.001 to 0.1 mm thick, and can be deposited onto the air electrode 14 by conventional electrochemical vapor deposition (EVD) techniques.

A selected radial segment 20 of the air electrode 14, preferably extending along the entire active cell length, is masked during fabrication of the solid electrolyte, and is covered by a thin, dense, gas-tight, interconnection 22, which provides an electrical contacting area to an adjacent cell (not shown) or to a power contact (not shown), as known in the art. The interconnection 22, covering the surface of the air electrode 14 along most of the radial segment 20, must be electrically conductive in both an oxidant and fuel environment at elevated temperatures. The interconnection 22 is typically made of lanthanum chromite ($LaCrO_3$) doped with calcium, barium, strontium, magnesium or cobalt, and has a coefficient of thermal expansion of about $10.5 \times 10^{-6}/°$ C. The interconnection 22 is roughly similar in thickness to the solid electrolyte 16. The interconnection 22 should be non-porous, e.g., at least about 95% dense, and electrically conductive at 1,000° C., the usual operating temperature of the fuel cell. The interconnection 22 can be deposited onto the air electrode 14 by high temperature, electrochemical vapor deposition (EVD) techniques. An electrically conductive top layer 24 approximately 0.05 to 0.1 mm thick is deposited over the interconnection 22, and is typically made of nickel or a nickel-zirconia or cobalt-zirconia cermet of the same composition as the fuel electrode described below.

Surrounding the remainder of the outer periphery of the fuel cell 10, on top of the solid electrolyte 16, except at the interconnection area 20, is a fuel electrode 18 (or anode), which is in contact with the fuel during operation of the cell. The fuel electrode 18 is a thin, electrically conductive, porous structure, typically made of nickel-zirconia or cobalt-zirconia cermet approximately 0.03 to 0.1 mm thick. As shown, the solid electrolyte 16 and fuel electrode 18 are discontinuous, with the fuel electrode being spaced-apart from the interconnection 22 to avoid direct electrical contact. The fuel electrode 18 and conductive layer 24 can be deposited on the solid electrolyte 16 and interconnection 22, respectively, by known techniques such as dipping or spraying.

During operation at approximately 1,000° C., a gaseous fuel, such as hydrogen ($H_2$) or carbon monoxide (CO), or sometimes natural gas (primarily comprising methane), is directed over the outside of the fuel cell 10, and a source of oxygen, such as air or oxygen ($O_2$), is passed through the inside of the fuel cell. The oxygen molecules pass through the porous electrically conductive air electrode 14 and form oxygen ions at the interface between the air electrode 14 and solid electrolyte 16. The oxygen ions then migrate through the solid electrolyte 16 material to combine with the fuel at the interface between the electrolyte 16 and fuel electrode 18. The oxygen ions release electrons at the fuel electrode 18, which are then collected at the air electrode 14 through an external load circuit, thus generating a flow of electrical current in an external circuit from the fuel electrode 18 to the air electrode 14. The electrochemical reaction of oxygen with fuel thus produces a potential difference across the external load which maintains a continuous electron and oxygen ion flow in a closed circuit during the generation of electricity. Multiple cells can be electrically connected in series by contact between the interconnection of one cell and the fuel electrode of another cell. The cells can also be electrically connected in parallel by contact between the fuel electrode of one cell and the fuel electrode of another cell.

The porous air electrode 14 remains exposed to a hot oxidant gas atmosphere, usually air, heated to approximately 1,000° C. during generator operation. Furthermore, oxygen reduction takes place at the air electrode-electrolyte interface. In the tubular fuel cell configuration, the porous, electrically conductive, air electrode 14 maintains intimate contact with the dense, gas-tight, oxygen ion conductive, solid electrolyte 16, and the dense, gas-tight, electrically conductive, interconnection 22. The selection of a suitable air electrode must be done carefully to ensure that the air electrode has certain properties including high conductivity at the high operating temperatures, low resistance contact to the solid electrolyte, good chemical, structural and dimensional stability at high operating temperatures, sufficient gas permeation porosity, and good match of the coefficient of thermal expansion with the solid electrolyte and interconnection.

Structural and dimensional stability of the air electrode, in particular, is an important criteria for maintaining long term mechanical integrity necessary for successful fuel cell operations, especially under isothermal or thermal cycling during cell fabrication and operation. For example, if an air electrode having a length of 100 cm exhibits a differential heat shrinkage of 0.05 percent compared with the solid electrolyte or interconnection, a 0.5 mm difference in length between the air electrode and the solid electrolyte or the interconnection would occur. This would result in severe stresses between the materials which could destroy the fuel cell. The coefficient of thermal expansion of the air electrode 14 is preferably matched with the coefficient of thermal expansion of the solid electrolyte 16 and inner connection 22 in order to reduce differential shrinkage of the air electrode material. In a preferred embodiment, the coefficient of thermal expansion of the air electrode material is from about $10.4 \times 10^{-6}/°$ C. to about $10.6 \times 10^{-6}/°$ C.

In accordance with a preferred embodiment of the present invention, the air electrode composition comprises a perovskite-like crystal structure of the formula $ABO_3$, wherein the A-site comprises La, Ca, Ce and at least one lanthanide selected from Sm, Gd, Dy, Er, Y and Nd. The A-site lanthanides preferably include Sm, Gd, Dy and Er, with Sm being particularly suitable. The B-site of the air electrode composition comprises Mn, preferably with no doping of the B-site. The ratio of A:B is preferably from about 1:1 to about 1.02:1, more preferably from about 1.001:1 to about 1.01:1. The constituents of the A-site are preferably provided in sufficient amounts to achieve a coefficient of thermal expansion of the air electrode material of about $10.4 \times 10^{-6}/°$ C. to about $10.6 \times 10^{-6}/°$ C. Preferably, the air electrode composition has a thermal cycle shrinkage of less than about 0.001 percent per cycle. As used herein, the term "thermal cycle shrinkage" means the amount of shrinkage exhibited by a material it is periodically cycled between temperatures of 600° C. and 1,000° C., expressed in terms of percentage of shrinkage per cycle.

In accordance with the present invention, the amount of Ce provided in the A-site is sufficient to control sintering properties, while substantially eliminating precipitation of $CeO_2$ at operating temperatures of about 1,000° C. The amount of lanthanide provided in the A-site is controlled in order to achieve the desired thermal expansion properties. The amount of Ca in the A-site is controlled in order to provide sufficiently low resistivity. Furthermore, by substantially eliminating Ni from the B-site, a significant loss of oxygen below $10^{-7}$ atm partial pressure of oxygen at 1,000° C. is avoided. This improves operation at very high current flows which may be used to obtain maximum wattage from SOFCs. The present electrode material also reduces or eliminates phase transition bumps in thermal expansion curves that are seen in conventional SOFC electrode materials. Furthermore, in accordance with the present invention, there is no need for composition adjustments due to variations in composition for materials in the A-site or analytical determination required to make such adjustments.

A preferred air electrode composition of the present invention is of the formula: $La_wCa_xLn_yCe_zMnO_3$, wherein Ln comprises at least one lanthanide selected from Sm, Gd, Dy, Er, Y and Nd, w is from about 0.55 to about 0.56, x is from about 0.255 to about 0.265, y is from about 0.0175 to about 0.185, and z is from about 0.005 to about 0.02. In this formula, Ln is preferably Sm, Gd, Dy and/or Er, with Sm being particularly suitable. The sum of w, x, y and z is preferably from about 1 to about 1.02, more preferably from about 1.001 to about 1.01. A particularly preferred composition is of the formula $La_{0.555}Ca_{0.26}Ln_{0.18}Ce_{0.01}MnO_3$.

Figure 2:
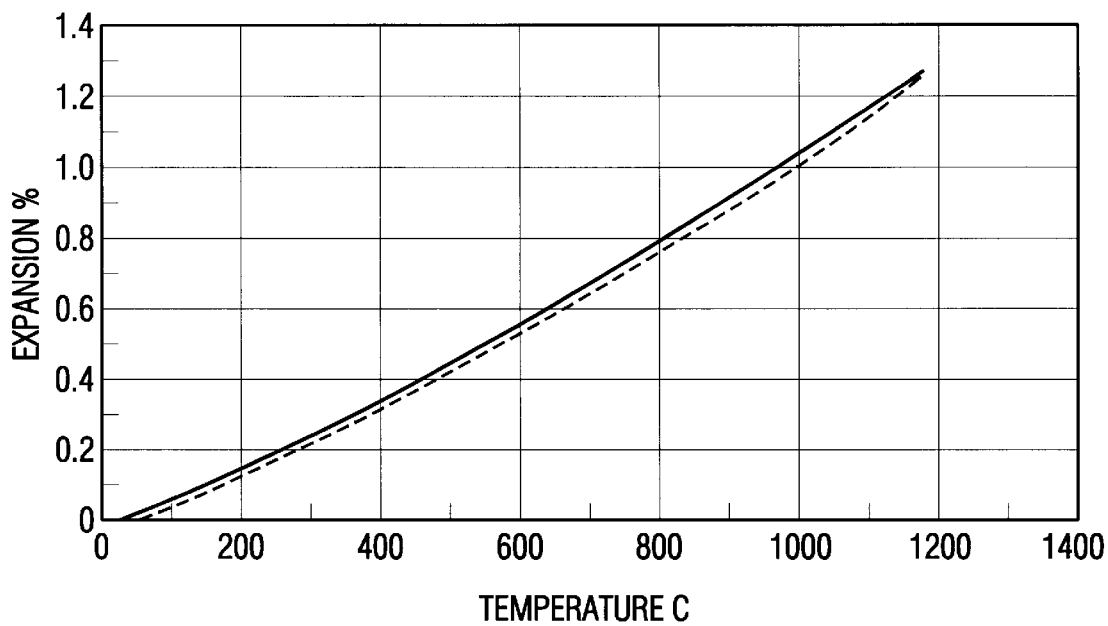
FIG. 2 is a graph showing favorable thermal expansion characteristics of a SOFC electrode material in accordance with the present invention.
Figure 4:
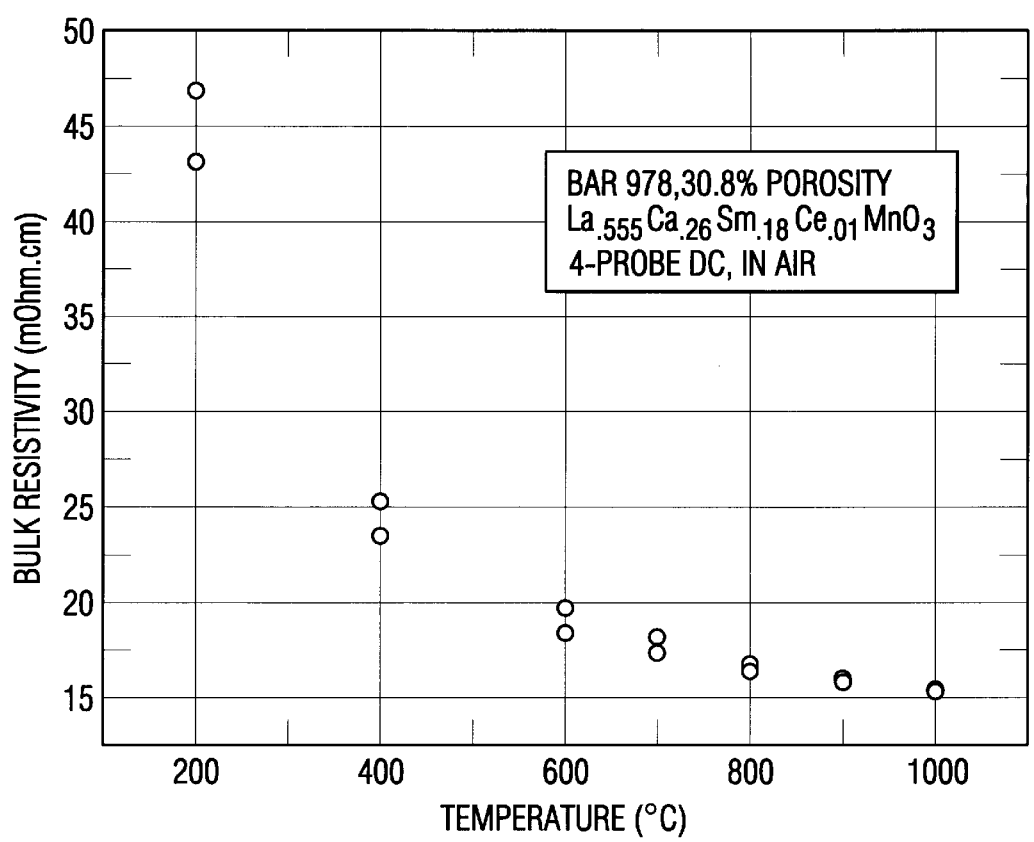
FIG. 4 is a graph showing favorable electrical resistivity of a SOFC electrode material of the present invention.
Figure 3:
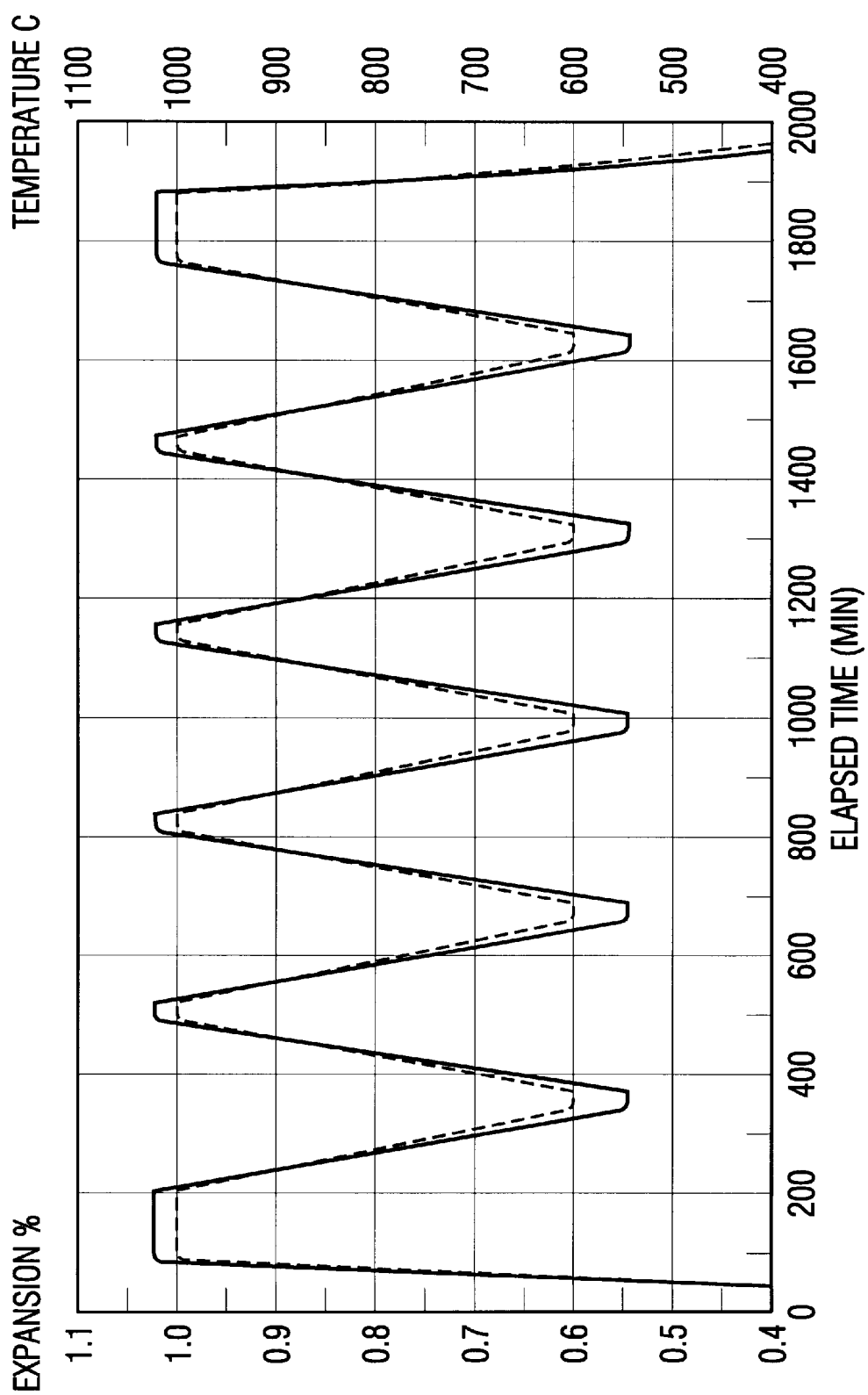
FIG. 3 is a graph showing very low thermal cycling shrinkage for a SOFC electrode material of the present invention.

FIGS. 2–4 show the highly favorable properties achieved by an air electrode composition of the formula $La_{0.555}Ca_{0.26}Sm_{0.18}Ce_{0.01}MnO_3$ in accordance with the present invention. FIG. 2 is a graph demonstrating the advantageous thermal expansion characteristics of the air electrode material, while FIG. 3 is a graph demonstrating the very low thermal cycle shrinkage of the material. FIG. 4 is a graph showing the favorable electrical resistivity of the air electrode material.

Figure 5:
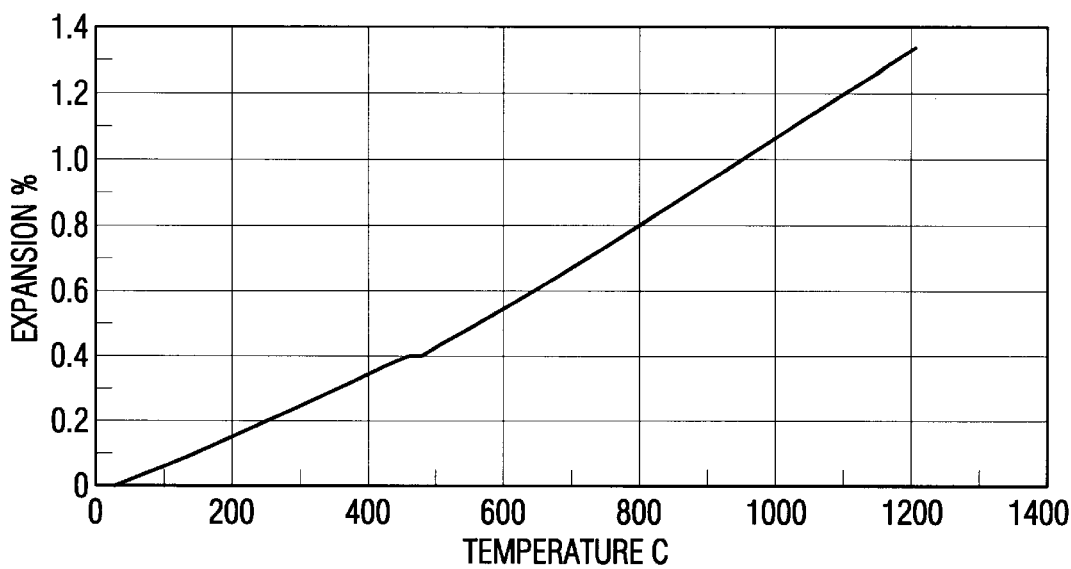
FIG. 5 is a graph showing thermal expansion characteristics of a conventional SOFC electrode material, including a phase transition bump in the thermal expansion curve at a temperature of about 460 to 480° C.

FIG. 5 is a graph showing the thermal expansion characteristics of a conventional SOFC air electrode material of the formula $La_{0.7}Ca_{0.2}Ce_{0.105}Mn_{0.94}Cr_{0.04}Ni_{0.02}O_3$. As shown in FIG. 5, the material demonstrates a phase transition bump in the thermal expansion curve at a temperature of about 460 to about 480° C.

Figure 6:
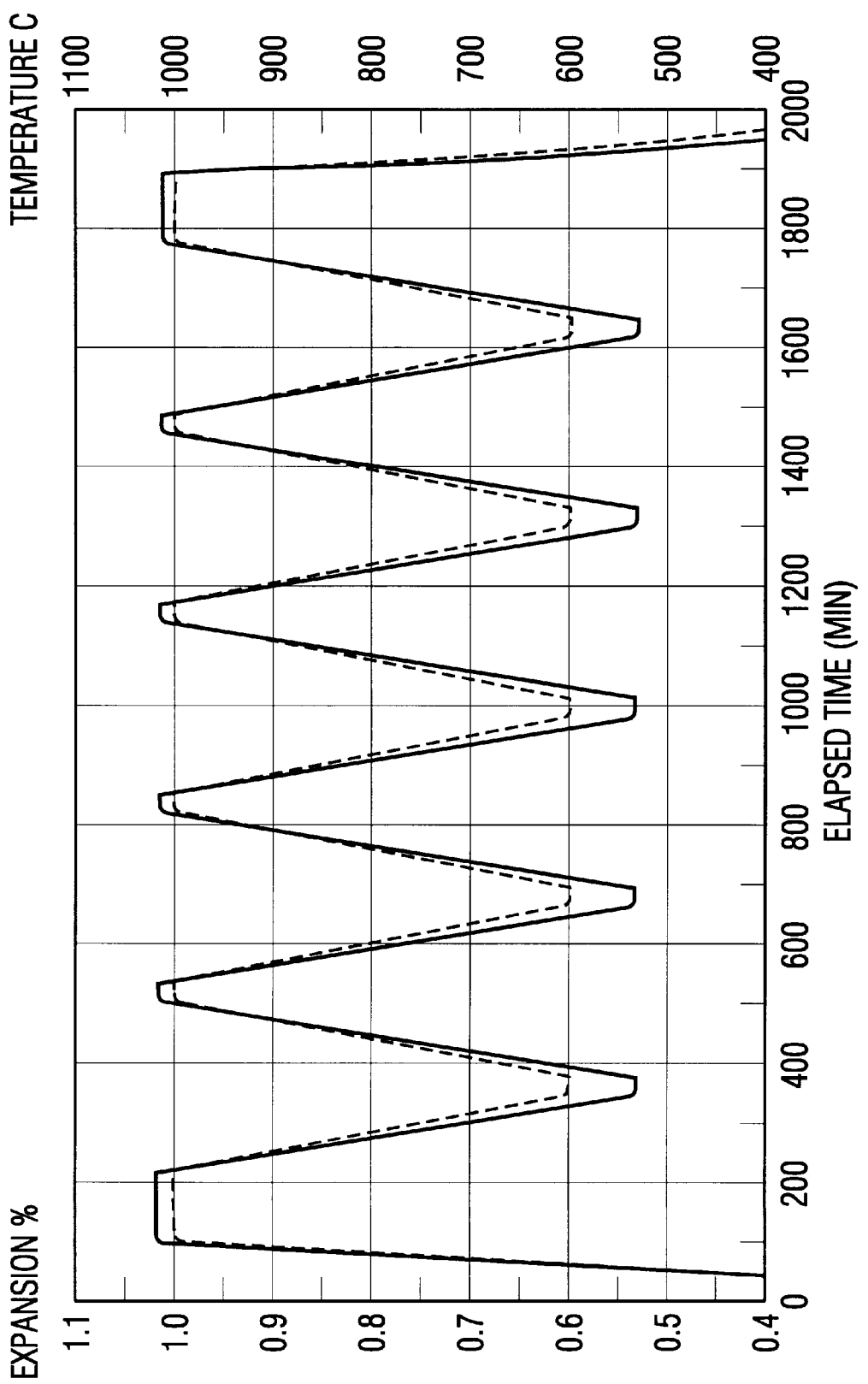
FIG. 6 is a graph showing very low thermal cycling shrinkage for a SOFC electrode material in accordance with another embodiment of the present invention.

FIG. 6 is a graph demonstrating very low thermal cycle shrinkage for an air electrode material of the present invention of the formula $La_{0.555}Ca_{0.26}Gd_{0.18}Ce_{0.01}MnO_3$.

Figure 7:
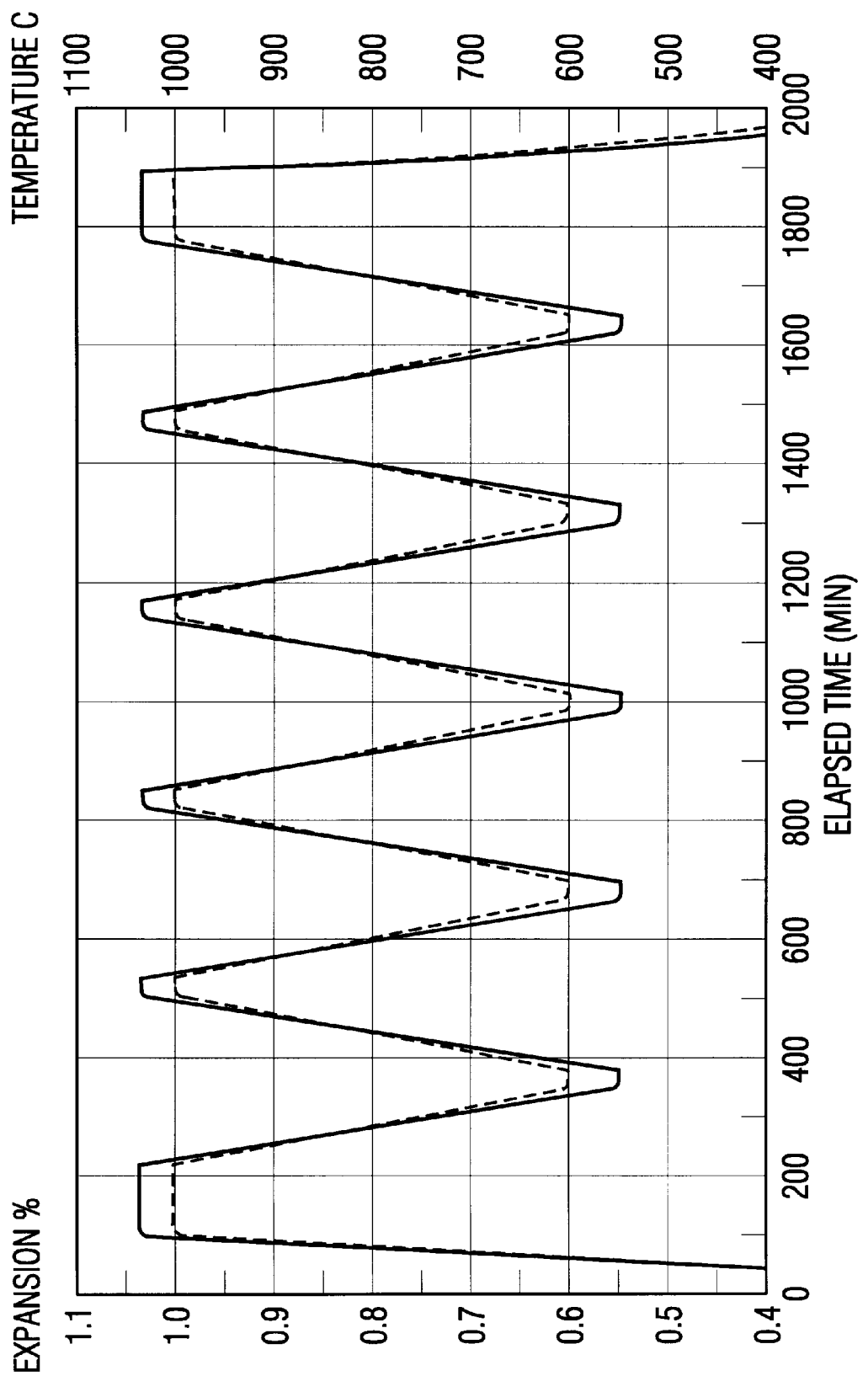
FIG. 7 is a graph showing very low thermal cycling shrinkage for a SOFC electrode material in accordance with a further embodiment of the present invention.

FIG. 7 is a graph showing very low thermal cycle shrinkage for another air electrode material of the formula $La_{0.555}Ca_{0.26}Dy_{0.18}Ce_{0.01MnO3}$ in accordance with the present invention.

Table 1 lists properties of a conventional electrode material of the formula $La_{0.7}Ca_{0.2}Ce_{0.105}Mn_{0.94}Cr_{0.04}Ni_{0.02}O_3$ (sample No. 1), a comparative material of the formula $La_{0.52}Nd_{0.13}Pr_{0.054}Sm_{0.0001}Ca_{0.20}Ce_{0.105}Mn_{0.94}Cr_{0.04}Ni_{0.02}O_3$ (Sample No. 2). and an electrode material of the present invention of the formula $La_{0.555}Ca_{0.26}Sm_{0.18}Ce_{0.01}MnO_3$ having no Mn-site doping (Sample No. 3).

TABLE 1

| Sample No. | Sample Type | Porosity % | Electrical Resistivity $m\Omega \cdot cm^2$ | Thermal Expansion $\times 10^{-6}/°C$. | Cyclic Shrinkage % per Cycle |
|---|---|---|---|---|---|
| 1 | tube | 30 | 12.5 | 10.8–10.9 | 0.001–0.003 |
| 2 | tube | 31 | 20.8 | 10.5 | 0.002 |
| 3 | bar | 31 | 15.4 | 10.5 | <0.001 |

Useful characteristics which distinguish Sample No. 3 of the present invention over Sample Nos. 1 and 2 are: very small ceria content of about 1 atomic percent which reduces the chance for thermal expansion change during operation due to $CeO_2$ precipitation; no significant phase transition bump for thermal expansion in the 25 to 1,000° C. range; substantially no substitution in the Mn-site which reduces or eliminates premature oxygen loss at low oxygen pressures which occurs in Ni-doped compositions below about $10^{-7}$ atm $PO_2$ at 1,000° C.; and the use of greater than 98 percent $La_2O_3$ and $Sm_2O_3$ instead of lanthanum concentrate which may eliminate the need to analyze the lanthanide material and adjust the nominal composition. Furthermore, thermial cycle shrinkage of Sample No. 3 is very low and is less variable in comparison with Sample No. 1 In addition, precipitation in Sample No. 2 causes a thermal expansion increase of about 1 percent during the first 500 hours of operation, which is avoided by the Sample No. 3 air electrode composition.

Figure 8:
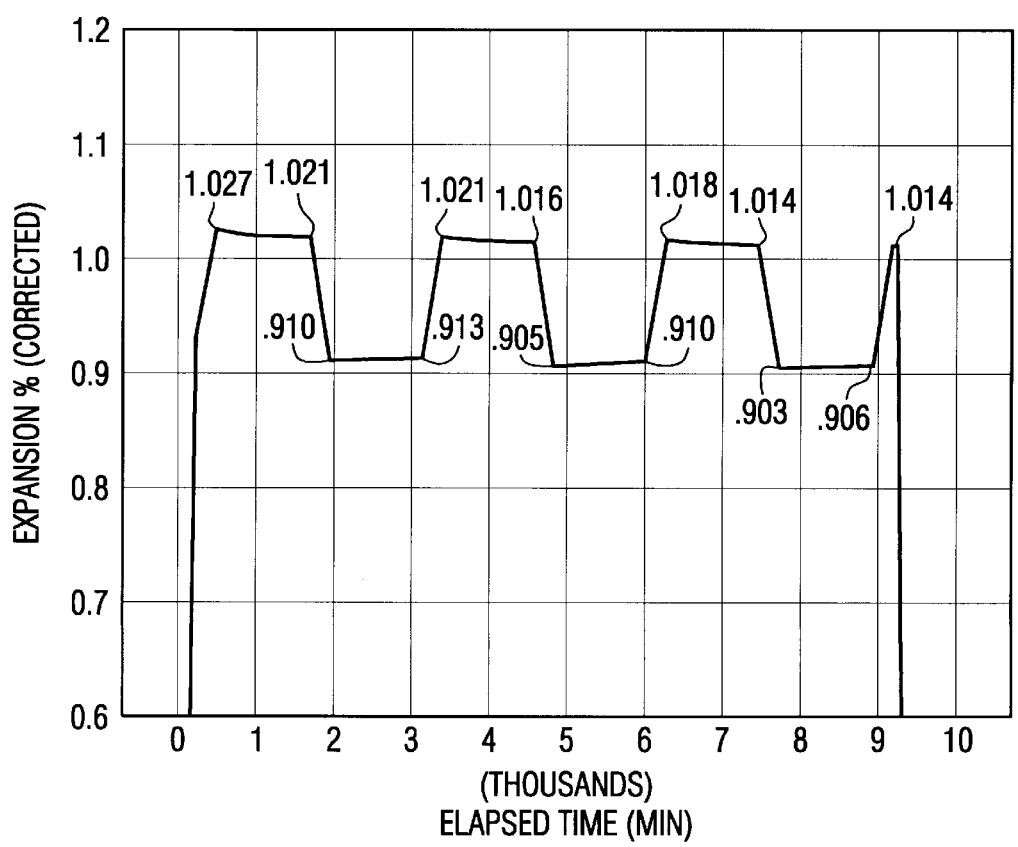
FIG. 8 is a graph showing improved thermal cycling characteristics over an extended period of time for a SOFC electrode material in accordance with an embodiment of the present invention.
Figure 9:
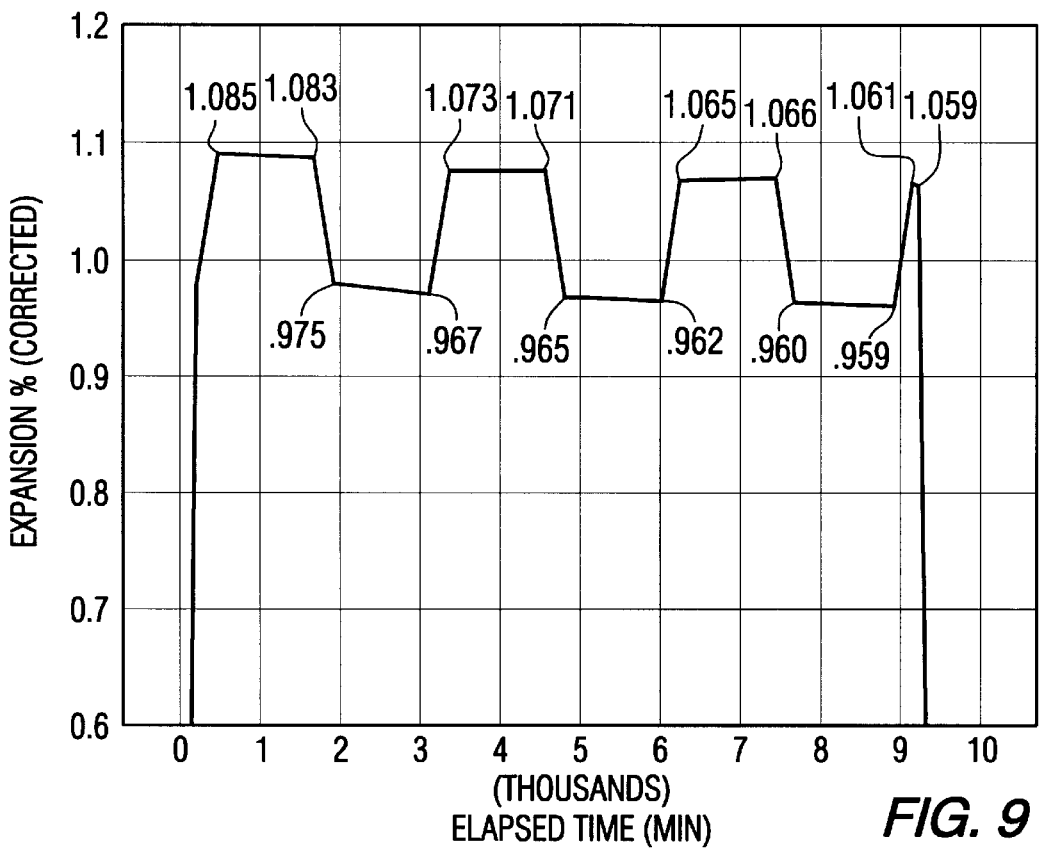
FIG. 9 is a graph showing thermal cycling characteristics over an extended period of time for a comparative SOFC electrode material.
Figure 10:
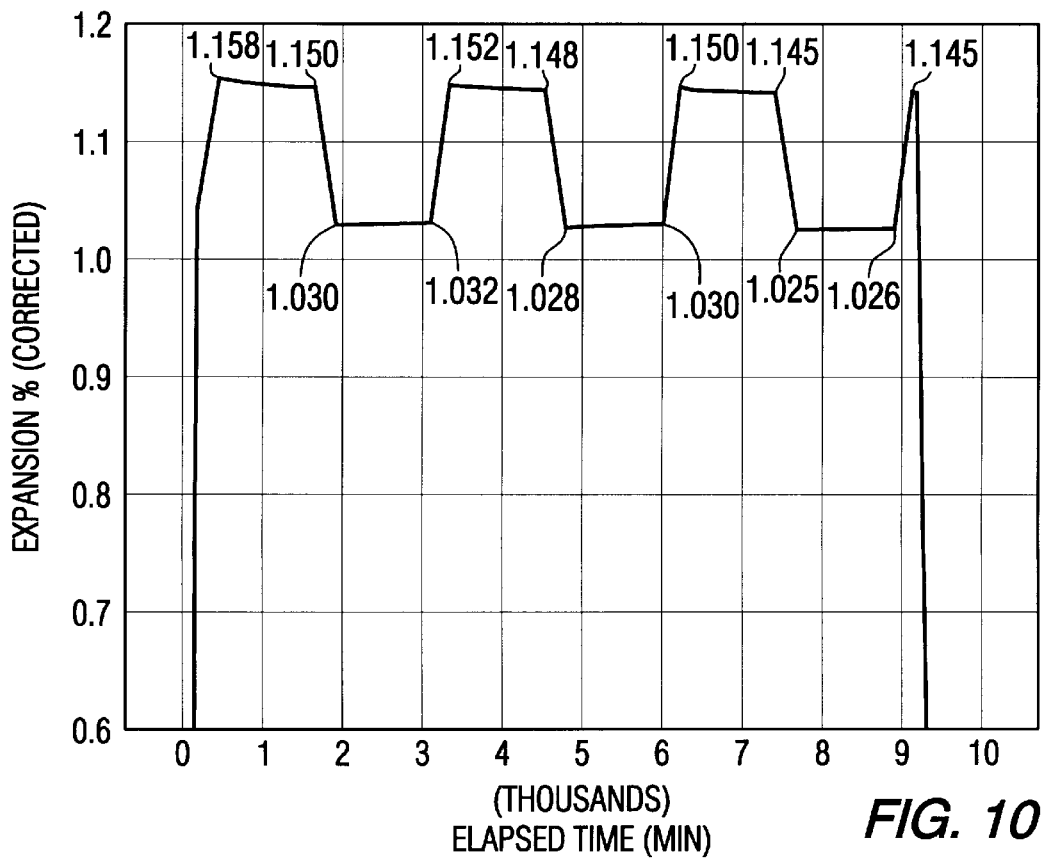
FIG. 10 is a graph showing thermal cycling characteristics over an extended period of time for another comparative SOFC material.

A SOFC air electrode electrode material of the formula $La_{0.555}Ca_{0.26}Sm_{0.18}Ce_{0.01}MnO_3$ subjected to a severe cycling test for about one week. The results are shown in FIG. 8. The data shown in FIG. 8 was compared with data generated from a similar test of material of the formula $La_{0.52}Nd_{0.13}Pr_{0.054}Sm_{0.0001}Ca_{0.20}Ce_{0.105}Mn_{0.94}Cr_{0.04}Ni_{0.02}O_3$ shown in FIG. 9. A reference air electrode of the formula $La_{0.7}Ca_{0.3}MnO_3$ which has high thermal expansion but which is known to possess an exceptionally low 5-cycle shrinkage value of close to zero, was tested in a similar manner, with the results shown in FIG. 10. Over a period of one week, a total shrinkage value of 0.013 percent was obtained for the low cyclic shrinkage reference material $La_{0.7}Ca_{0.3}MnO_3$, an excellent value identical to that of the present material $La_{0.555}Ca_{0.26}Sm_{0.18}Ce_{0.01}MnO_3$, and half the value of 0.026 for material of the formula $La_{0.52}Nd_{0.13}Pr_{0.054}Sm_{0.0001}Ca_{0.20}Ce_{0.105}Mn_{0.94}Cr_{0.04}Ni_{0.02}O_3$. The electrode material of the present invention thus provides significantly better SOFC performance and reliability in comparison with conventional electrode materials.

Whereas particular embodiments of this invention have been described above for purposes of illustration, it will be evident to those skilled in the art that numerous variations of the details of the present invention may be made without departing from the invention as defined in the appended claims.

What is claimed is:

1. A solid oxide fuel cell air electrode composition comprising a perovskite-like crystal structure of the formula $ABO_3$, wherein:
   (a) the A-site consists of La, Ca, Ce and at least one lanthanide selected from the group consisting of Sm, Gd, Dy, Er, Y and Nd;
   (b) the B-site consists of Mn; and
   (c) the ration of A:B is from about 1:1 to about 1.02:1; and Ce is present from about 0.5 to about 2 atomic percent.

2. The composition of claim 1, wherein the A-site comprises from about 55 to about 56 atomic percent La, from about 25.5 to about 26.5 atomic percent Ca, and from about 17.5 to about 18.5 atomic percent of the at least one lanthanide.

3. The composition of claim 1, wherein the at least one lanthanide is selected from the group consisting of Sm, Gd, Dy and Er.

4. The composition of claim 1, wherein the at least one lanthanide is Sm.

5. The composition of claim 1, wherein the B-site is substantially free of dopants.

6. The composition of claim 1, wherein the ratio of A:B is from about 1.001:1 to about 1.01:1.

7. The composition of claim 1, wherein the La, Ca, Ce and at least one lanthanide of the A-site are present in sufficient amounts to achieve a coefficient of thermal expansion of the composition of from about $10.4 \times 10^{-6}/°C$. to about $10.6 \times 10^{-6}/°C$.

8. The composition of claim 1, wherein the composition has at thermal cycle shrinkage of less than about 0.001 percent per cycle.

9. A solid oxide fuel cell air electrode composition of the formula:

$$La_w Ca_x Ln_y Ce_z MnO_3,$$

wherein Ln consists essentially of at least one lanthanide selected from the group consisting of Sm, Gd, Dy, Er, Y and Nd, w is from about 0.55 to about 0.56, x is from about 0.255 to about 0.265, y is from about 0.175 to about 0.185, and z is from about 0.005 to about 0.02.

10. The composition of claim 9, wherein Ln is selected from the group consisting of Sm, Gd, Dy and Er.

11. The composition of claim 9, wherein Ln is Sm.

12. The composition of claim 9, wherein the sum of w, x, y and z is from about 1 to about 1.02.

13. The composition of claim 9, wherein the sum of w, x, y and z is from about 1.001 to about 1.01.

14. The composition of claim 9, wherein the composition is of the formula $La_{0.555}Ca_{0.26}Ln_{0.18}Ce_{0.01}MnO_3$.

15. The composition of claim 9, wherein the composition is of the formula $La_{0.555}Ca_{0.26}Sm_{0.18}Ce_{0.01}MnO_3$.

16. The composition of claim 9, wherein the composition is of the formula $La_{0.555}Ca_{0.26}Gd_{0.18}Ce_{0.01}MnO_3$.

17. The composition of claim 9, wherein the composition is of the formula $La_{0.555}Ca_{0.26}Dy_{0.18}Ce_{0.01}MnO_3$.

18. The composition of claim 9, wherein Ln consists of at least one lanthanide selected from the group consisting of Sm, Gd, Dy, Er, Y and Nd, and the composition has a coefficient of thermal expansion of from bout $10.4 \times 10^{-6}/°C$. to about $10.6 \times 10^{-6}/°C$.

19. The composition of claim 9, wherein the composition has a thermal cycle shrinkage of less than about 0.001 percent per cycle.

* * * * *